United States Patent [19]

Kuwana et al.

[11] 3,716,454
[45] Feb. 13, 1973

[54] PROCESS FOR THE PRODUCTION OF α-AMINOBENZLPENICILLIN

[75] Inventors: Noriaki Kuwana, Nerima-ku, Tokyo; Tamio Kawanmura, Bunkyo-ku, Tokyo; Masayuki Fukumura, Hiratsuka-shi, Kanagawa, all of Japan

[73] Assignee: Eisai Kabushiki Kaisha, Bunkyo-ku, Tokyo, Japan

[22] Filed: May 11, 1970

[21] Appl. No.: 36,482

[30] Foreign Application Priority Data

Sept. 2, 1969 Japan ............................... 44/69075

[52] U.S. Cl. ................................... 195/30, 195/36 P
[51] Int. Cl. ............................................... C12d 9/00
[58] Field of Search .............................. 195/36 P, 30

[56] References Cited

UNITED STATES PATENTS 3,079,307  2/1963  Kaufmann et al. .................. 195/36 P

*Primary Examiner*—Alvin E. Tanenholtz
*Attorney*—Wenderoth, Lind & Ponack

[57] ABSTRACT

A process for the enzymatic production of D-(-)-α-aminobenzylpenicillin, i.e., Ampicillin, which is one of the semi-synthetic penicillins useful as an antibiotic, starting from 6-aminopenicillanic acid and a functional derivative of D-(-)-α-aminophenylacetic acid.

The process is conducted in an aqueous medium in the presence of a new microorganism named Flavobacterium EF 44–102 (ATCC No. 21429).

The said microorganism efficiently catalyzes the aforementioned enzymatic reaction to form ampicillin.

8 Claims, No Drawings

PROCESS FOR THE PRODUCTION OF α-AMINOBENZLPENICILLIN

This invention relates to a process for the production of D-(-)-α-aminobenzylpenicillin which hereinafter is called ampicillin.

According to the process of the present invention, ampicillin is effectively produced by reacting 6-aminopenicillanic acid with a functional derivative of D-(-)-α-aminophenylacetic acid in the presence of a new bacterium belonging to genus Flavobacterium or enzyme produced thereby, the prefix "D-(-)-" in the above being hereinafter omitted for simplification. The new bacterium utilized in the process of the present invention was found in the soil of a certain area in Osaka-prefecture of Japan and was isolated therefrom by the present inventors.

Several methods are already known in the art with respect to synthetic preparation of penicillins such as ampicillin by pure chemical reaction of 6-aminopenicillanic acid and α-aminophenylacetic anhydride, chloride or the like. It is, however, known that the synthetic preparation by the pure chemical reaction of non-naturally occurring penicillins generally has a drawback of racemizating the acyl moiety of the resulting penicillin depending upon the reaction condition to be employed. In addition, these synthetic methods are liable to be accompanied by undesirable concominant side-reactions such as decomposition, hydrolysis and polymerization of the reactants and reaction products in the course of the reaction.

There is another method known as the "enzymatic method" of producing semi-synthetic penicllins in which a particular microoganism or enzyme produced thereby is employed as catalyst. U. S. Pat. No. 3,079,306, for example, discloses a method of producing 6-(phenoxy-type acyl)-aminopenicillanic acids by an enzymatic condensation reaction of 6-aminopenicillanic acid and a functional derivative of a certain phenoxy-carboxylic acid such as an ester, amide or salt thereof, in the presence of cell suspension of Escherichia coli.

Furthermore, South African Pat. Publication No. 3,870/62 mentions another method of producing ampicillin by the enzymatic condensation reaction of 6-aminopenicillanic acid with the ethyl ester or amide of α-aminophenylacetic acid, in the presence of bacterium such as Escherichia coli, Alcaligenes faecalis, Aerobacter aerogenes, Proteus, Salmonella, Micrococcus and Arthrobacter.

As will be seen in the disclosures of the aforementioned patent specifications, all the bacteria as well as enzymes formed thereby, called "penicillin-amidases," both of which are utilized in the known methods, are selected from those which are capable of inactivating within 24 hours at least 20 percent of the activity of penicillin G to result in formation of a solution due to a partial split of the amido-linkage between the phenylacetyl and amino groups in the 6-position of penicillin G as substrate, when the latter is brought into contact with the amidases under a certain condition. The lost activity of the penicllin G in the resultant solution can at least partially be restored when the solution is treated with phenylacetyl chloride.

Thus, the prior art methods are based on a discovery of the fact that the so-called "penicillin-amidases" are capable of facilitating linkage of an acyl group and the amino group of 6-aminopenicillanic acid in an acidic medium, the said penicillin-amidases having originally been known to be capable of splitting the 6-amido-linkage of penicillin G in an alkaline medium.

In these cases, it is noted that although these particular enzymes show a remarkable catalytic activity of generating natural penicillin G, they show a considerably poor catalytic activity for production of semi-synthetic penicillins.

Under the circumstances, it is difficult to obtain the desired semi-synthetic penicillins with a commercially available productivity, even though the substrate was employed at a high concentration.

Accordingly, the primary object of the present invention is to provide a process for the selective and efficient production of ampicillin by enzymatically acylating 6-aminopenicillanic acid as substrate in a high concentration with a functional derivative of α-aminophenylacetic acid, without undesirable concomitant side-reactions involving racemization and decomposition that would take place in the known pure chemical methods for the production of semi-synthetic penicillins.

In order to achieve the above object, after an extensive research the present inventors succeeded in locating and isolating a particular bacterium belonging to Flavobacterium genus to which the name "Flavobacterium 44-102" was given. The bacterium is characterized by the fact that it produces a penicillin-amidase which is wholly distinguished from the hitherto known enzymes or penicillin-amidases by virtue of its excellent catalytic activity of producing ampicillin rather than penicillin G from 6-aminopenicillanic acid. A novel enzymatic method for the preparation of ampicillin has here been established according to the present invention by utilizing the said bacterium.

The morphological and physiological characteristics of the strain of the bacterium are shown as follows:

A. Microscopic observations in nutrient agar
  1. Appearance:
     Straight rod-shaped cells with round ends, almost all in singles, some in pairs but not in a long chain or irregular masses
  2. Sizes: 0.5–0.8 to 2.0–2.5 microns
  3. Motility: None
  4. Flagella: None
  5. Spore formation: None
  6. Gram stain: Negative B. Morphological characteristics
  1. Nutrient broth at 27° C. for 96 hours:
     Turbid with a slight white sediment and with a ring on the surface
  2. Nutrient agar:
     1. Slant culture at 27° C. for 48 hours:
        Abundant growth, mucous, yellow and shiny; no growth at a temperature of about 37° C.; with water-insoluble pigment
     2. Plate culture at 27° C. for 48 hours:
        Mucous, yellow and shiny colonies
  3. In glucose-nutrient broth at 27° C. for 96 hours:
     Uniformly turbid with a ring on the surface
  4. Nutrient agar at 27° C. for 96 hours:
     Growth slightly slow; mucous, yellow and shiny colonies with water-insoluble pigment
  5. Gelatin stub culture at 27° C. for 96 hours:

Growth only at surface, yellow colonies, no growth in stub, no or almost faint liquefaction 6. Litmus-milk:
   27° C. after 158 hours, faded white, no change in pH-value and no coagulation
7. Glucose-inorganic salt agar slant:
   At 27° C. for 7 days, very slow development of yellow cells C. Physiological properties:
1. Good growth at 24°–29° C., no growth at 37° C.
2. Oxygen requirement: Aerobic
3. Reduction of nitrate to nitrite: Negative
4. Production of indole: Negative
5. Production of hydrogen sulfide: Negative
6. Liquefaction of agar: Negative
7. Liquefaction of gelatin: Negative or faint
8. Salt requirement for growing: Negative
9. On potato plug: Yellow streak
10. Catalase activity: Positive
11. Hydrolysis of starch: Negative
12. Acid fast staining: Negative
13. Utility or assimilation of 2,4-dichlorophenoxyacetic acid as carbon source: Negative D. Fermentation Test with carbohydrates No formations of acids and gases take place in contact with:

Ribose, xylose, glucose, fructose, galactose, sorbose, arabinose, raffinose, lactose, sucrose, rhamnose, mannose, maltose, melibiose, melezitose, trehalose, dextrin, starch, glycerol, xylitol, erythritol, sorbitol, adnitol, inositol, mannitol, esculin, salicin and inulin.

On checking the above data conforming to the teachings of Bergey's "Manual of Determinative Bacteriology", 7th edition, it is sure that there is a certain similarity between the characteristics of the specified bacterium and the known Flavobacterium peregrinum. There is, however, a clear distinction between the two, because the former bacterium shows such characteristics as considerably weak gelatin-liquefaction, strong litmus-milk fading and non-utilization or assimilation of 2,4-dichlorophenoxyacetic acid.

It is accordingly obvious that Flavobacterium EF 44–102 is a new bacterium which is distinguished from the known ones. The specimens of the said new bacterium have been deposited in the FERMENTATION RESEARCH INSTITUTE OF JAPAN under FERM-P No. 343 and also in the AMERICAN TYPE CULTURE COLLECTION under the assigned Number ATCC 21429.

As was mentioned in several reports and patent specifications, various penicillin-amidases have been produced with the aid of various microorganisms. They are generally classified into two groups depending upon their individual enzymatic behaviors against penicillin substrates. The first group is derived from the bacteria and is capable of readily hydrolyzing penicillin G, and the second group is widely distributed among Actinomyces and Filamentous fungi and is capable of readily splitting penicillin V and penicillin K. For instance, according to the article reported by C. A. Claridge in "Proceedings of the Society for Experimental Biology and Medicine", 113, 1008 (1963), penicillin-amidases originating from Alcaligenes faecalis and Escherichia coli attack penicillin G, penicillin V, ampicillin and the like to produce 6-aminopenicillanic acid. The said article further reports that the yields of the 6-aminopenicillanic acid thus obtained will vary depending upon the sort of penicillin substrates to be treated. In either event, it was found that penicillin G is most readily split by these penicillin-amidases. Such knowledge is completely in accord with the general disposition of the known enzymetic methods.

Contrary to the above, it is surprisingly observed that the particular penicillin-amidase produced by Flavobacterium EF 44–102 does not show any appreciable activity against penicillin G; it catalyses formation of only a minor amount of 6-aminopenicillanic acid from penicillin V. It is moreover noteworthy that the penicillin-amidase from the specified bacterium exhibits a peculiar enzymatic activity against ampicillin and splits almost quantitatively the 6-amido-bonding of ampicillin, leading to 6-aminopenicillanic acid and that the said penicillin-amidase acts as a catalyst for producing almost quantitatively ampicillin from 6-aminopenicillanic acid and a functional derivative of α-aminophenylacetic acid.

The existence of such new and peculiar penicillin-amidase was not expected at all by those skilled in the art. A novel process for the production of ampicillin on a commercial scale has thus been established according to the present invention by utilizing the said penicillin-amidase.

Flavobacterium EF 44–102 may be cultivated in a nutrient medium which contains proper amounts of organic and/or inorganic nitrogen sources such as peptone, meat extract, corn steep liquor, dry yeast, soybean protein hydrolyzate, soybean extract and inorganic ammonium salts as well as carbon sources such as molasses, glucose, starch hydrolyzate and inorganic salts. The cultivation is effected by any of the conventional procedures such as shaking, submerged and stationary cultivations at a temperature of 10°–35° C. for 12–48 hours.

In carrying out the enzymatic reaction according to the present invention, the specific microorganism may be utilized in a form of a culture broth per se, bacterial cells harvested from the culture broth or a cell suspension. It should, however, be understood that the cell products treated by mechanical and/or chemical procedures may equally be used in a form of dry, disrupted or lyzed cells or in a form of partially purified enzyme preparation for the purpose of carrying out the process of the present invention, so far as their contemplated enzymatic activity is maintained.

The enzymatic reaction of the present invention is usually conducted by introducing any one of the cells or cell products such as those afore-mentioned into water, with or without buffer solution, which contains 6-aminopenicillanic acid or a salt thereof and a functional derivative of α-aminophenylacetic acid. 6-Aminopenicillanic acid in a form of free acid or salt thereof may be used at a concentration within the range of 0.1–20 mg/ml calculated as the free acid, and it is found that 2–5 mg/ml of the concentration is especially preferred.

On the other hand, the α-aminophenylacetic acid utilized as the acylating agent should be employed in a form of its reactive functional derivatives such as its ester and amide derivatives, and acid addition salts thereof, because in a form of free acid, the said compound almost does not react with 6-aminopenicillanic acid under the enzymatic reaction condition to be employed.

The acylating agent may be employed in the range of 2–20 moles per mole of the 6-aminopenicillanic acid. The molar proportion of the acylating agent to the 6-aminopenicillanic acid may, however, be varied suitably depending upon the concentration of the latter in the reaction mixture to be employed. In one explanatory embodiment, a ratio of 15 mg/ml of α-aminophenylacetic acid methyl ester hydrochloride to 4 mg/ml of 6-aminopenicillanic acid in the reaction mixture is preferable. The concentration of the methyl ester hydrochloride corresponds to four-fold molar excess as compared with the concentration of said 6-aminopenicillanic acid. The enzymatic reaction is conducted by stationary standing, shaking or agitating the reaction mixture at a temperature of 25°–50° C. for 0.5–24 hours, while maintaining the pH-value of the mixture in the range of approximately 4–8. It has been found that the pH-value of about 5.5–6.5 is preferable.

In the following, a few experiments are given provide a thorough understanding of the peculiar enzymatic behavior against penicillins of the specified penicillin-amidase produced by Flavobacterium EF 44–102, in comparison with the behaviors exhibited by the hitherto known bacterial penicillin-amidases.

EXPERIMENT 1

100 ml. of culture medium at the pH-value of 7.1 which contains 5 percent soybean extract, 0.1 percent yeast extract, 0.1 percent meat extract, 0.5 percent corn steep liquor, 2 percent glucose, 0.4% KC1, 0.5% $(NH_4)_2SO_4$ and 0.02% $K_2HPO_4$ was inoculated with Flavobacterium EF 44–102. The mixture was cultivated at 27° C. for 24 hours on a reciprocating shaker. After completion of the cultivation bacterial cells were harvested by centrifuge. The harvested living cells were re-suspended in 40 ml of a decimolar phosphate buffer solution (pH 7.0).

Five ml of the cell suspension thus obtained were diluted with an equal volume of the said decimolar phosphate buffer. 5,000 I.U. of penicillin G were then added thereto and the liquor was subjected to enzymatic reaction at 37° C. for 5 hours.

The antibiotic activity of the liquor thus obtained was then assayed by a plate method against Staphylococcus aureus F.D.A. 209 P. No activity depression of the penicillin G was observed after the experiment. The liquor was then made acidic and extracted with diethyl ether in order to remove the unchanged penicillin G, and the remaining aqueous phase was treated with phenylacetyl chloride. There was observed no appearance of an increased antibiotic activity in the phase.

EXPERIMENT 2

The enzymatic reaction of Experiment 1 was repeated by using ampicillin in place of penicillin G. It was found that the particular antibiotic activity of ampicillin disappeared completely. The treated aqueous solution, as it is or after immersion into a paper disc, sold by The Toyo Roshi K.K. of Japan was subjected to phenylacetylation by the conventional procedure. A substantial restoration of penicillin activity occurred.

From the above experiments, it was confirmed that Flavobacterium EF 44–102 to be used in the present invention does not exhibit any amidase activity to penicillin G, while it exhibits a potential amidase activity to ampicillin resulting in formation of 6-aminopenicillanic acid.

The following examples will serve to illustrate the invention, but are not to be construed as limiting the invention.

EXAMPLE 1

100 ml. of culture medium (pH 7.0) containing 1 percent meat extract, 1 percent polypeptone and 0.5% NaCl was inoculated with Flavobacterium EF 44–102. The mixture was then held at 27° C. for 48 hours, while shaking. The culture solution was adjusted to pH 7.5 with addition of one normal NaOH solution.

100 ml. of a decimolar phosphate buffer (pH 7.5) containing 4 mg/ml of 6-aminopenicillanic acid and 30mg/ml of α-aminophenylacetic acid methyl ester hydrochloride were added to the solution. The mixture was incubated at 37° C. for 4 hours.

After completion of the reaction, the antibiotic activity of the reaction mixture was estimated against Staphylococcus aureus F.D.A.209 P. The activity corresponding to 3.1 mg/ml of ampicillin was thus inspected. A minor amount of the mixture was dropped onto a piece of Filter Paper No. 50 sold by the Toyo Roshi K.K. of Japan and was subjected to paper chromatography using a butanol : ethanol : water solvent system of 5 : 1 : 4 (as the upper layer) and a pyride : isopropanol : water solvent system of 5 : 65 : 30. It was found that the active substance shows Rf-values of 0.3 and 0.6 respectively. The values are in accord with those of the authentic specimen of ampicillin.

EXAMPLE 2

Enzymatic reaction of Example 1 was repeated by using equimolecular amount of α-aminophenylacetic acid ethyl ester hydrochloride in place of the methyl ester hydrochloride. A reaction mixture was thus obtained having antibiotic activity corresponding to 2.8 mg/ml of ampicillin.

EXAMPLE 3

A culture medium (pH 7.1) containing 5 percent soybean extract, 0.1 percent yeast extract, 0.1 percent meat extract, 0.5% corn steep liquor, 2 percent glucose, 0.4% KCl, 0.5% $(NH_4)_2SO_4$ and 0.02% $K_2HPO_4$ was inoculated with Flavobacterium EF 44–102. The mixture was then cultivated at 27° C. for 45 hours, while shaking. The cell mass obtained by centrifuging 1 liter of the culture broth, which corresponds to 3.5 grams of dry cells, was suspended in 1 liter of distilled water. The resulting aqueous suspension was poured into 1 liter of an aqueous solution containing 8 grams of 6-aminopenicillanic acid and 30 grams of α-aminophenylacetic acid methyl ester hydrochloride and the pH-value of the resulting mixture was adjusted to 7.5. Enzymatic reaction of the mixture was carried out at 37° C. for 2 hours.

The antibiotic activity of the resulting mixture was assayed in accordance with the procedure mentioned in Example 1. It was found that the substrate, 6-aminopenicillanic acid, was almost completely acylated to ampicillin. The reaction mixture was centrifuged to remove the bacterial cells, and the aqueous layer thus obtained was treated with the ion exchange resin, Dowex — 1 × 2 (100–200 mesh), in accordance with a conventional manner. The aqueous solution thus obtained was lyophilized to obtain 10.6 grams of white powder. Assay of the antibiotic activity against E. coli NIHJ of the powder gave 82 percent purity of ampicillin.

EXAMPLE 4

The culture cells obtained by the procedure similar to that mentioned in Example 3 were suspended in a decimolar phosphate buffer (pH 7.5), and the resulting suspension was sonicated for 5 min. under ice-cooling to rupture the bacterial cells. The treated solution was centrifuged to obtain a clear enzyme solution. Enzymatic reaction was conducted in accordance with Example 1 by using said enzyme solution. A solution having antibiotic activity corresponding to 1.8 mg/ml of ampicillin was thus obtained.

EXAMPLE 5

Flavobacterium EF 44–102 was inoculated into a culture medium having the same composition as that of Example 3. The mixture was cultivated at 27° C. for 20 hours, while shaking.

150 ml of the cultivated fluid were added to 15 liters of the culture medium above-mentioned, which was held in a jar fermenter, and the cultivation was carried out at 27° C. for 24 hours, while stirring at 350 rpm and passing air through the medium at the rate of 30 liters per minute.

The cultivated fluid was centrifuged to recover the bacterial cells. The cells were suspended in 1.5 liters of distilled water, centrifuged and again suspended in 750 ml of distilled water. The cell suspension was then freeze-dried to obtain 32 grams of the dry-cells.

3 Grams of the dry-cells were added to one liter of an aqueous solution which contains 5 grams of 6-aminopenicillanic acid and 8 grams of α-aminophenylacetic acid methyl ester hydrochloride, the pH-value thereof having been adjusted to 6.2. The reaction mixture thus obtained was stirred at 37° C. After the lapse of 30 minutes, there was further added 6 grams of α-aminophenylacetic acid methyl ester hydrochloride. Furthermore, the respective additions of 4, 2, 2, and 2 grams of α-aminopehnylacetic acid methyl ester hydrochloride were followed in intervals of 30 minute's each. The enzymatic reaction was completed after 3 hours.

The content of the ampicillin in the reaction mixture was determined in accordance with the method reported by J. W. G. Smith et. al. [comp.; Analyst, 92, pp 247–252 (1967)]. There was observed the formation of 5.45 mg/ml of ampicillin which corresponds to 79.5 percent conversion of 6-aminopenicillanic acid.

The reaction mixture was centrifuged under cooling to remove the cells. The separated liquor was treated with the resin and freeze-dried according to the procedures given in Example 3.

There was obtained 6.2 grams of ampicillin in a form of white powder. Assay of the antibiotic activity of the powder against E. coli NIHJ gave 80.7 percent purity of ampicillin.

What is claimed is:

1. A process for preparing D-(-)-α-aminobenzylpenicillin, which comprises reaction 6-aminopenicillanic acid or a salt thereof with an ester or amide derivative of D-(-)-α-aminophenylacetic acid, or acid addition salt thereof, in the presence of the microorganism Flavobacterium EF 44–102 (ATCC No. 21429).

2. The process as claimed in claim 1 wherein the micro-organism is used in the form of bacterial cells thereof.

3. The process as claimed in claim 1 wherein the micro-organism is used in the form of a culture broth thereof.

4. The process as claimed in claim 1 wherein the micro-organism is used in the form of an enzyme preparation thereof.

5. The process as claimed in claim 1 wherein the 6-aminopenicillanic acid or salt thereof is reacted with the methyl ester of D-(-)-α-aminophenylacetic acid or its acid addition salt.

6. The process as claimed in claim 1 wherein the 6-aminopenicillanic acid or salt thereof is reacted with the ethyl ester of D-(-)-α- aminophenylacetic acid or its acid-addition salt.

7. The process as claimed in claim 1 wherein 2-20 moles of the derivative of D-(-)-α-aminophenylacetic acid or acid addition salt thereof are employed per mole of 6-aminopenicillanic acid or salt thereof.

8. The process as claimed in claim 1 wherein the reaction is carried out in an aqueous medium having a pH value between 4 and 8.

* * * * *